Patented July 6, 1937

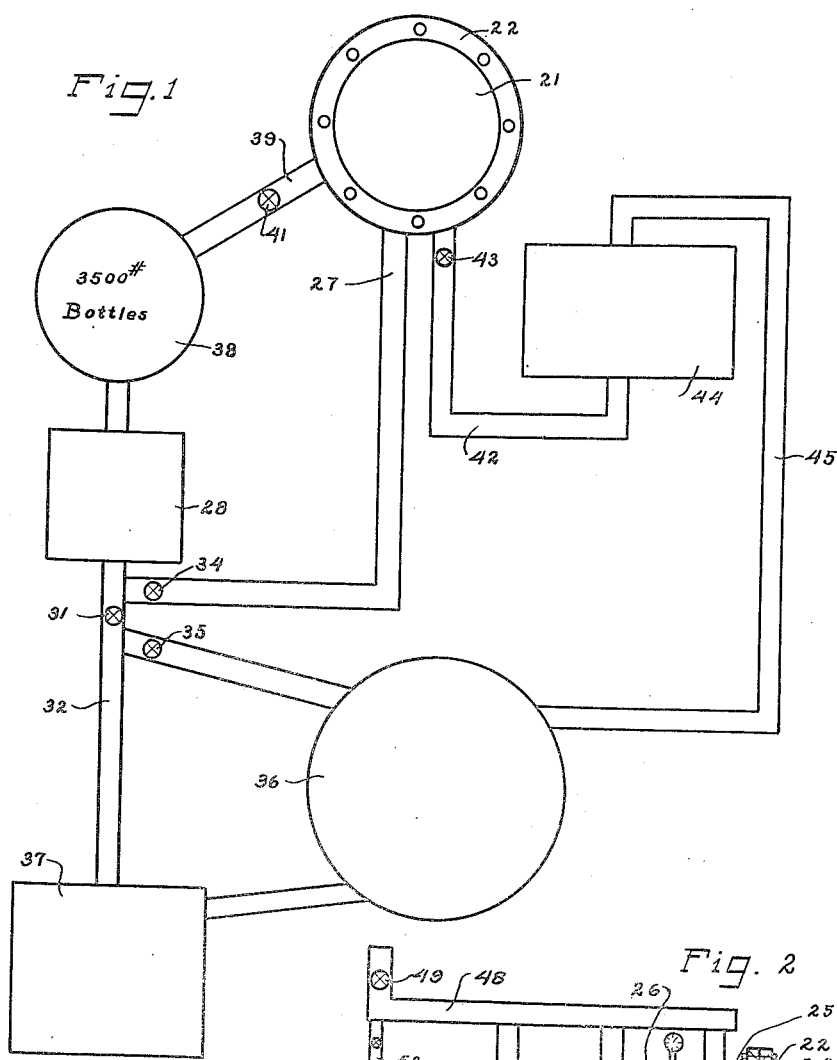
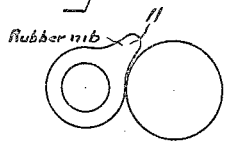
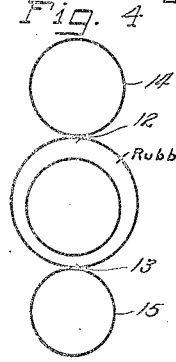
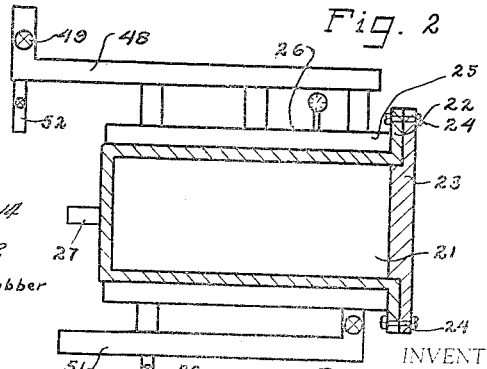

2,086,513

UNITED STATES PATENT OFFICE 2,086,513

EXPANDED RUBBER

Dudley Roberts, New York, N. Y., Thomas A. Scott, Baltimore, Md., and Frederick W. Peel, Yonkers, N. Y., assignors to Rubatex Products, Inc., a corporation of Delaware Application March 27, 1934, Serial No. 717,550

11 Claims. (Cl. 18—53)

Our invention relates to novel expanded rubber material and to a novel method of making the same.

Numerous efforts have been made to produce an expanded rubber with some of the same physical characteristics as hard rubber of the same constituents. To the usual qualities of hard rubber, such as compressibility, hardness, tensile strength, etc., expanded rubber has added advantages such as lightness, maximum volume for minimum rubber content, and superior insulating qualities for both heat and sound. The latter properties are obtained by introducing inert gases under pressure and expanding the rubber to form a cellular structure in the product, the gases being sealed and mechanically contained in the individual cells. For best results the cells should be as small as mechanically feasible, spherical and of uniform size. Each cell may then be regarded as producing an arch, the most efficient known means for transferring stresses. Weak spots such as might be produced by irregular sizes and shapes of cells are thus avoided.

In general the proposed methods for manufacturing such a product may be divided into two distinct and different groups, one being the manufacture of a froth or sponge rubber; the second being the manufacture of the distinctly different expanded rubber.

Thus it has been proposed to produce sponge rubber or expanded rubber by impregnating it with chemicals which yield gases at vulcanizing temperatures or by introducing the gases by mechanical treatment such as heating, stirring and kneading the rubber dough under an atmosphere of gas. It has also been proposed to make an expanded rubber by injecting gas into the mass.

In the case of sponge rubber the process is carried on so that the cells are relatively large in size and are not sealed from each other. The vulcanization is carried on only to a limited degree so that a relatively soft rubber is produced, the whole making a spongy cellular rubber mass which takes up and absorbs water.

None of these processes has been commercially successful due to many critical conditions which were not recognized heretofore. The product resulting from these processes either failed to expand sufficiently or, if it did expand, soon contracted, losing a considerable portion of its expanded volume. In some cases it was proposed to inject air into the rubber at high pressure and at temperatures at which the oxygen in the air oxidized the unstable rubber, producing a brittle, crumbly product. Moreover, it was not recognized that rubber, like metal, may become fatigued, or to express this otherwise, may distort its molecular alignment when it is worked very intensely, and thus destroy its valuable properties.

We have discovered that in making an expanded rubber which will have the desirable properties, such as tensile and compressive strength, lightness, uniform porosity and long life without contraction, it is important to obtain a thorough impregnation of the constituents entering the rubber. Furthermore, it is essential that following each stage of operation, suitable rest periods be provided to restore the rubber to its original molecular arrangement to prevent fatigue and therefore destruction of the qualities of the rubber. Again, it is necessary that the gas forced into the dough be an inert gas which will not combine with the active rubber, and it is required that such gas be forced into air free rubber dough while in a soft state in a vacuum. Moreover, it is indispensable to produce only a partial vulcanization and expansion in one step and at a predetermined rate, and thereafter a complete vulcanization and expansion in a second step, and finally it is imperative that the second stage occur at a predetermined time interval after the completion of the first stage.

By satisfying all of these conditions unerringly, we have been successful in producing an expanded rubber of substantially uniform cellular structure and containing within the cells a gas, extremely light and having a relatively low coefficient of heat and sound conduction.

Accordingly, an object of our invention is to provide a novel expanded gassed rubber and a novel process of making the same.

A further object of our invention is to provide a novel process for making expanded rubber in which the ingredients are first thoroughly mixed and intermediate the stages of working the rubber, suitable rest periods are provided for restoring the rubber to an unstrained molecular state.

Still a further object of our invention is to provide novel apparatus for and methods of introducing inert gas into an evacuated vessel containing the rubber dough.

Another object of our invention is to provide novel processes of expanding rubber which comprise subjecting the rubber to an inert gas at a predetermined pressure and heating the rubber to a predetermined temperature to produce a partial expansion and vulcanization, and within a predetermined interval thereafter, completing the vulcanization and expansion.

A still further object of our invention is to provide a novel system for making expanded rubber which comprises a closed gas conduit circuit in which pressures and temperatures can be readily controlled and in which excess gases are reclaimed for repeated use.

There are other objects of our invention which together with the foregoing will appear in the detailed description which is to follow in connection with the drawing in which:

Figure 1 is a circuit diagram of one form of system used in carrying out our invention;

Figure 2 is a cross section of the autoclave used in my invention;

Figure 3 is a diagrammatic side view of the masticating rolls; and

Figure 4 is a diagrammatic view of the calender.

In carrying out our invention, the ingredients entering into the product are mixed in approximately the following percentages by weight:

| | Per cent |
|---|---|
| Washed first grade pale crepe or smoked rubber | 40–75 |
| Sulphur | 6–30 |
| Light calcined magnesia | 3– 5 |
| Ground gilsonite | 12 |
| Lower melting bituminous substances | 12 |

The base ingredient of the product is the rubber which is preferably of a pale crepe grade #1, obtained in sheets about $\frac{1}{32}''$ to $\frac{1}{16}'' \times 10'' \times 20''$.

These sheets of rubber are passed through masticating mills consisting of two rollers rotating in opposite directions as in the case of meshing gears. One roller, however, rotates slightly faster than the other, so that the rubber fed between the rolls tends to rub on the surfaces of the different speed rolls and a nib is formed as shown at 11, Figure 3. The extent of this nib depends on the relative speeds of the rolls and the nib in turn determines how much of the two surfaces 12 and 13 of the rubber engage and are masticated by the respective rolls 14 and 15.

The rolls are steam heated to a temperature of approximately 150° F. as the rubber sheets are fed between them. The rubber is masticated or softened in this process, the individual sheets combining into a single mass of soft rubber, the degree of mastication depending on the spacing of the rolls, the temperature and the period of operation. We have found, however, that a mastication of one pound per minute at a roller temperature of 150° F. is sufficient for our purposes.

To this resulting soft rubber mass is now added an asphalt product or soft bitumin, such as suffron or mineral rubber. This asphalt is divided into fine particles and passed through a sixteen mesh sieve. While the rubber revolves on the masticating rolls, these particles of bitumin are shovelled on and are uniformly distributed over the rubber. The heat of the rubber melts the bitumin which penetrates into and is absorbed by the rubber.

The bitumin acts as a flux at low temperatures in the stage of partial vulcanization to be explained hereinafter. Any other low temperature flux may be substituted, i. e., a low melting hydrocarbon of the asphaltic group of a bituminous or waxy nature, having fluxing properties, such as paraffin wax and stearic acid. During this stage the rubber has turned from a light to a dark color.

Ground gilsonite, divided into even finer particles than bitumin and passed through a one hundred and sixty mesh sieve, is now sprinkled or shovelled on the rubber, still passing through the masticating rolls. Gilsonite is an asphalt like bitumin, but has a much higher melting point. It will accordingly not be melted by the rubber, but will nevertheless penetrate into, impregnate and be absorbed by the soft spongy mass of rubber. Gilsonite functions as a flux in a high temperature stage to be described hereinafter, and may accordingly be replaced by any suitable high temperature flux such as a high temperature asphalt. In using the expression "flux", it will be understood that we mean a substance acting to amalgamate or assist in the vulcanizing.

Summarizing the above, three stages have been described. In the first, the rolls were heated to a temperature of 150° F. while masticating or softening the rubber to combine the individual sheets into a single soft spongy mass. Assuming twenty-four pounds of rubber, twenty-four minutes may ordinarily be required for this operation.

In the second stage, a low temperature flux is applied to the rubber as it continues to pass over the rolls, in the proportions given above, and this, by reason of the heat, melts into and is absorbed by the rubber.

In the third stage, a high temperature flux is admixed with the rubber while it passes through the rolls, again in the proportions given above.

The second and third stages take fourteen minutes additional to the twenty-four minutes for mastication and result in a rubber impregnated with a high and low temperature hydrocarbon. The molecular structure of rubber is theoretically described as normally being in the form of a spiral. This may be thought as giving to the rubber its elasticity and strength. During the working of the rubber described above, a disturbance of the molecular structure apparently occurs and the rubber tends to lose its natural qualities.

We have discovered that it is essential to provide a rest period for the rubber at this stage of the operations to permit the rubber to restore itself to its original condition.

Accordingly, in the next or fourth stage, the rubber now flat, soft and porous, is permitted to cool off and is left to rest for about twelve hours, preferably in a dark, dry room at a temperature of from 80° to 100° F. The longer the rest period, the more the rubber regains its original conditions, but we have found that twelve hours will ordinarily be sufficient to restore it to about its original condition.

Following this rest period, these slabs of rubber are placed on rolls maintained at temperatures of from 120° to 130° F. As the rubber passes between the rolls, additional slabs are added, which ultimately combine into a soft mass of rubber. When the mass has been formed with adjacent engaging surfaces adhering, sulphur and light calcined magnesia, in the proportions given above, are added as the rolls rotate. Sulphur is the vulcanizer and the light calcined magnesia is the rubber toughener. Any equivalent rubber toughener, such as zinc oxide, may replace the calcined magnesia. For thorough absorption, the rolling is continued for a period of about twenty minutes.

The product is now removed from the rolls in strips or slabs of about one-half inch in thickness and two feet in length. The distorting effect of passing the rubber through the rolls is now again corrected by providing a second twenty-four hour rest period in a dark, warm, dry room at about the same temperature as the previous rest period. Again the length of the rest period may vary, but at least twenty-four hours is necessary, and the longer this period, the more nearly the rubber is restored to normal.

The rubber is now placed on a warmer mill consisting of two rollers rotating at the same speed. The rubber is fed between the rolls maintained at a temperature of from 120° to 140° F. This is continued until the rubber again becomes soft and forms into a uniform plastic composite mass and during which the rubber may be formed into slabs, boards, etc., after which a further rest period of twelve hours is provided. Or, if desired, the rubber may be passed through a forcing machine which we prefer to use for preforming the rubber in any desired shape, such as aeroplane wings, struts, pontoons, etc. If preferred, the forcing operations may also be used to soften the rubber in the earlier roller stages described hereinbefore.

The various stages of treatment described above have resulted in agitating the rubber to such an extent that a quantity of air has been absorbed by the rubber. The presence of this air may have serious deteriorating effect during the subsequent stages to be described hereinafter. This may be described as follows:

Like glass, rubber is a plastic or super-cooled viscous liquid. Normally it would be crystalline, but is prevented from becoming so because of the complexity of the molecules which are large and slow-moving due to the viscosity of the mixture. This super-cooled viscous liquid is chemically an unstable product which tends to stabilize itself. This is particularly true if the rubber is warmed to just below melting point which favors crystallization. The presence of air under these conditions is particularly conductive to crystallization, a simple oxidation resulting from a relatively simple rubber compound which crystallizes out.

Moreover, rubber oxidizes easily because it has unsaturations or double bonds which tend to readily combine with the oxygen, especially under the influence of heat and pressure, thus making the rubber brittle. In the presence of air, rubber therefore tends to oxidize. Attacked or oxidized by even a small amount of air, the rubber becomes brittle, as is well known.

To prevent this, the rubber, as is commonly known, is vulcanized, i. e., stabilized. This consists in heating the rubber with sulphur to form a vulcanized or stable product so that it no longer tends to combine with oxygen in the air. The sulphur forms a mixture of complex compounds which prevents crystallization and oxidation.

The presence, however, of even a small quantity of air may result in an oxidation, for the reasons explained above, even before vulcanization sets in.

Accordingly, it is important to force out all the air that may have mixed with the rubber before the stage of partial vulcanization, to be described, occurs.

To this end the rubber is passed between successive calenders maintained at a temperature of from 130° to 150° F. The calender mill comprises a series of rolls decreasingly spaced from each other in successive steps. In the first step, as shown in Figure 4, the rolls are relatively far apart, in the next stage closer, etc. The rubber passing through the calender forces all the trapped air out and is reduced in size. After the rubber passes the last roll, a sheet of cloth is applied thereto to close faults appearing in the rubber and to prevent the rubber from contracting. The cloth, having a limited expansion, keeps the stretch in rubber and maintains it at a predetermined thickness.

The rubber is now cooled to room temperature and the cloth removed, leaving a sheet of untreated rubber. The product is now ready for the two final stages of vulcanization to be described. These vary somewhat for different products. In making boards the sheet may be approximately $\tfrac{1}{8}''$ x 5'⅝'' x 1'10''. Approximately ten such sheets of rubber may be placed with metal sheets interposed between each sheet of rubber, and the whole placed in a metal container having an internal dimension slightly larger than the sheets. A cover is then fastened into place on the container. A number of these containers are then placed into a gassing autoclave which is then closed and fastened down. The autoclave has previously been aired by passing steam through the container and heating it to a temperature of from 180° to 212° F. to remove moisture.

A vacuum pump is then connected to an inlet of the container to extract the air until a vacuum of about five inches is obtained. The evacuation is important for the reasons already pointed out hereinbefore. When the container has been evacuated, gas is admitted into the autoclave at a pressure of from 150 to 200 atmospheres. Any inert gas, preferably non-combustible, and having no affinity for raw rubber, such as nitrogen (N), ammonia ($NH_3$), helium (He) may be used for this. Thus air would be disastrous, if used. Forcing air into raw rubber at several hundred atmospheres pressure and at or near vulcanizing temperatures, would tend to oxidize the rubber very rapidly and before vulcanization set in, resulting in an undesirable product. Moreover, it would be dangerous practice, because a spark would cause a terrific explosion.

While the gas is being forced into the rubber, steam at eight pounds pressure is admitted to the steam chest. About thirty minutes are necessary for the container to reach a stable temperature, and thereafter the container is maintained at the same temperature continuing to supply steam at about eight pounds pressure.

The conditions in this stage are critical and accordingly both the pressure of the gas and the temperature of the container must be correct. The rubber, while exposed to the gas, is in a soft plastic state and therefore readily receives the gas. The eight pounds of steam in the steam jacket produce a temperature at which partial vulcanization proceeds to a substantially uniform degree throughout the body of the rubber. This partial vulcanization functions to harden the rubber sufficiently so that it retains the gas forced into the rubber. At this time substantially little or no expansion of the rubber has taken place due to its confinement within the container.

The autoclave is now permitted to cool off under atmospheric conditions and subsequently cold water is forced through the steam jacket until a temperature of 60°–70° F. is reached. This permits the rubber now in semi-cured state to set.

Excess gas in the autoclave is now removed. The rubber, being partially cured, will hold gas under pressure in its individual cells. The rubber sheets are now removed from the containers with the result that the pressure is removed and the gas in the cells immediately expands the rubber about four times.

In order to make boards 3′ x 1′ x 1½′, the partially cured rubber is placed in a mold of the desired dimensions. Each mold is placed between platens and saturated steam is applied at ninety-five pounds for about forty to forty-five minutes. This is the final stage of the process of the curing and expansion. The rubber expands to the size of the molds and at the same time complete curing or vulcanization of the rubber is obtained. The steam is now turned off and the product permitted to cool. If desired, cooling may be hastened by applying cold water. The end product is an expanded cellular inert gas filled product weighing about five pounds per cubic foot.

This stage, during which the vulcanization is completed, must take place within forty-eight hours after the completion of the partial expansion and vulcanization. Otherwise sufficient gas may escape from the partially vulcanized rubber so that there is a material loss in volume.

In the event that more than forty-eight hours elapse before the last stage of the process occurs, it is preferable to regrind the material and add it into the new dough in small percentages.

It is also possible, alternatively, in the event that more than forty-eight hours is to elapse, to take care of this condition by carrying on the first stage to a further degree of vulcanization than originally contemplated by applying the steam for a longer period of time or at a higher temperature than is obtained by eight pounds of steam.

In fact, we have found from experiments that the first stage can be carried on at from eight to sixteen pounds of steam, although better results are obtained at the lower range. When the greater degree of vulcanization occurs, the material can be kept for a longer period than forty-eight hours without the gas diffusion.

For manufacturing struts and the like, the gassing operations would be substantially the same. Instead of placing the sheets in a container, they may be placed between metal plates held in place by clamps.

An alternative method of manufacturing thicker boards would be to fill a metal container with only one plate in the center. The container is filled with French chalk. In the partial vulcanization stage, steam is applied at eight pounds to raise the temperature to a stabilization value, and this steam application is continued for four hundred minutes. The apparatus is permitted to cool down naturally for a period not less than twelve hours and within twenty-four hours the second or final expansion and vulcanization stage occurs.

In Figures 1 and 2 we have illustrated diagrammatically one system for carrying out the vulcanization steps of the invention.

The cylindrically-shaped autoclave 21, consisting of nickel steel walls 22 and a cover 23, secured in place by bolts 24 and surrounded by the steam jacket 25 of boiler plate 26, has protruding from the rear thereof a line 27 extending to a pump 28.

With the containers containing the rubber placed in the autoclave, pump 28, in the process described above, is first operated with valves 31 connected in line 32, extending to gas tank 37 closed and valve 34 opened to exhaust the chamber of the autoclave.

When a vacuum of about five inches has been obtained, the valve 34 is closed and valve 31 is opened as are valves 35 and 41. The inert gas received from source 37 and the tank 36 is now pumped by pump 28 into the autoclave through bottle 38, which delivers gas at a pressure of from 150 to 200 atmospheres, over line 39 and through valve 41 to the autoclave.

At the completion of the gassing operation described above, the excess gas is recovered over conduit 42 through valve 43 opened at this time and through the chalk separator 44 and line 45 to the tank 36.

Simultaneously with the gassing described above, steam is admitted into the steam chest from line 48 through valve 49. For subsequent cooling water from line 51 is forced through the jacket and drained off at 52 and 53.

Although we have described in detail the specific constituents of a preferred form of our product and the exact steps of one process for forming the same, it will be obvious that modifications thereof still coming within the scope of the invention may be made in both the constituent parts and in the process, and we do not intend to be limited, for example by the specific circuit or detailed process shown and described for purposes of illustration, but only by the appended claims.

We claim:

1. In the method of manufacturing an expanded rubber, the steps which comprise inserting a substantially air-free rubber composition into an autoclave, evacuating the autoclave; admitting to the autoclave an inert gas having no affinity for rubber at a pressure of from 150 to 200 atmospheres; and heating the autoclave to the temperature by steam of the order of 8 to 16 pounds pressure to partially vulcanize the rubber.

2. In the method of manufacturing an expanded rubber, the steps which comprise inserting a substantially air-free rubber composition into an autoclave, evacuating the autoclave; admitting to the autoclave an inert gas having no affinity for rubber at a pressure of from 150 to 200 atmospheres; heating the autoclave to the temperature by steam of the order of 8 to 16 pounds pressure to partially vulcanize the rubber; thereafter removing the rubber; and within a predetermined interval completing the vulcanization.

3. In the method of manufacturing an expanded rubber, the steps which comprise inserting a substantially air-free rubber composition into an evacuated autoclave, evacuating the autoclave; admitting to the autoclave an inert gas having no affinity for rubber at a pressure of from 150 to 200 atmospheres while preventing the rubber from any substantial expansion; heating the autoclave to the temperature by steam of the order of 8 to 16 pounds pressure to partially vulcanize the rubber; thereafter removing the rubber to permit expansion due to the gas contained therein; and thereafter within a predetermined interval completing the vulcanization by heating the rubber to a vulcanizing temperature.

4. In the method of manufacturing an expanded rubber, the steps which comprise inserting a substantially air-free rubber composition containing a fluxer, vulcanizer and hardener into an autoclave, evacuating the autoclave; admitting to the autoclave an inert gas having no affinity for rubber at a pressure of from 150 to 200 atmospheres; and heating the autoclave to the temperature by steam of the order of 8 to 16 pounds pressure to partially vulcanize the rubber.

5. In the method of manufacturing an expanded rubber, the steps which comprise inserting a substantially air-free rubber composition containing a high and low temperature fluxer, vulcanizer and hardener into an autoclave, evacuating the autoclave; admitting to the autoclave an inert gas having no affinity for rubber at a pressure of from 150 to 200 atmospheres; and heating the autoclave to the temperature by steam of the order of 8 to 16 pounds pressure to partially vulcanize the rubber.

6. In the method of manufacturing an expanded rubber, the steps which comprise inserting a substantially air-free rubber composition containing an asphalt, sulphur and a hardener into an autoclave, evacuating the autoclave; admitting to the autoclave an inert gas having no affinity for rubber at a pressure of from 150 to 200 atmospheres; and heating the autoclave to the temperature by steam of the order of 8 to 16 pounds pressure to partially vulcanize the rubber.

7. The process of manufacturing expanded rubber which comprises masticating rubber at a temperature of approximately 150° F., forcing air from rubber, resting the rubber after each mastication operation to restore the rubber "nerve", placing the rubber in the autoclave, evacuating the autoclave to five inches, admitting inert gas having no affinity for rubber at a pressure of from 150 to 200 atmospheres, simultaneously heating the autoclave by steam to a temperature corresponding to steam pressure from 8 to 16 pounds for partial vulcanization, removing the rubber from the autoclave and applying saturated steam at 25 pounds to complete vulcanization and expansion of the rubber.

8. The process of manufacturing expanded rubber which comprises masticating rubber at a temperature of approximately 150° F., forcing air from rubber, resting the rubber after each mastication operation to restore the rubber "nerve", admitting inert gas having no affinity for rubber at a pressure of from 150 to 200 atmospheres, admitting the rubber to the autoclave, evacuating the autoclave, simultaneously heating the autoclave by steam to a temperature corresponding to steam pressure from 8 to 16 pounds for partial vulcanization, removing the rubber from the autoclave and applying saturated steam at 25 pounds to complete vulcanization and expansion of the rubber.

9. The process of manufacturing expanded rubber which comprises masticating rubber at a temperature of approximately 150° F., forcing air from rubber, resting the rubber after each mastication operation to restore the rubber "nerve" at 130°–150° F., admitting inert gas having no affinity for rubber at a pressure of from 150 to 200 atmospheres, admitting the rubber to the autoclave, evacuating the autoclave, simultaneously heating the autoclave by steam to a temperature corresponding to steam pressure from 8 to 16 pounds for partial vulcanization, removing the rubber from the autoclave and applying saturated steam at 25 pounds to complete vulcanization and expansion of the rubber.

10. The process of manufacturing expanded rubber which comprises masticating rubber at a temperature of approximately 150° F., resting the rubber for a period of approximately twelve hours to restore it to the original state, combining slabs on rolls at 132° F., resting the rubber again to restore it to the original state, admitting inert gas having no affinity for rubber at a pressure of from 150 to 200 atmospheres, admitting the rubber to the autoclave, evacuating the autoclave, simultaneously heating the autoclave by steam to a temperature corresponding to steam pressure from 8 to 16 pounds for partial vulcanization, removing rubber from the autoclave and applying saturated steam at 25 pounds to complete vulcanization and expansion of the rubber.

11. In the method of manufacturing rubber, the steps which comprise masticating the rubber at a temperature of approximately 150° F. to produce a softened mass of rubber; resting the rubber for a period to restore its original "nerve"; combining slabs of rubber at temperatures of from 120° to 130° F.; again resting the rubber to restore it to normal; forcing substantially all the air from the rubber which was entrapped during the preceding steps; admitting the rubber to an autoclave; evacuating an autoclave; admitting an inert gas having no affinity for rubber to the autoclave at a pressure of 150 to 200 atmospheres, while simultaneously heating the autoclave to a temperature obtained by 8 to 16 pounds of steam pressure; maintaining the temperature until the rubber is partially vulcanized to hold the gas with which it is saturated; cooling the autoclave and thereafter completely vulcanizing the rubber at a temperature obtained by saturated steam at 95 pounds and maintaining the temperature for about 45 minutes.

DUDLEY ROBERTS.
THOMAS A. SCOTT.
FREDERICK W. PEEL.